May 31, 1949.                R. CADWALLADER                2,471,810
              DOOR CONSTRUCION RECEIVING SLIDABLE WINDOW
                         Filed Aug. 2, 1944
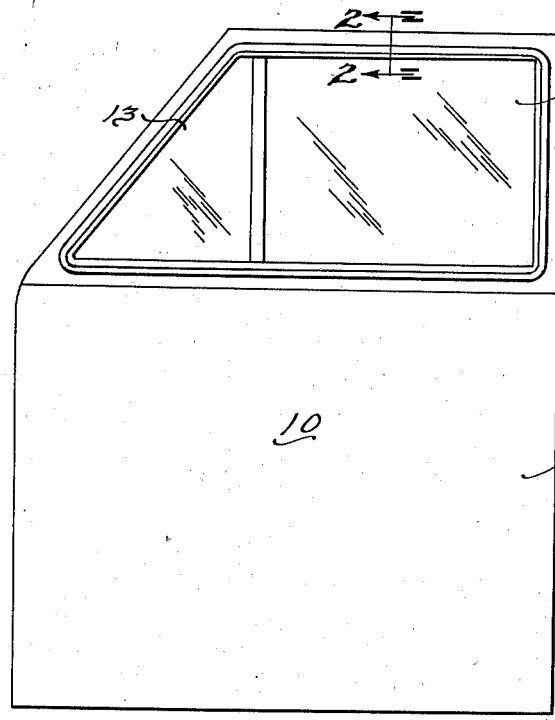
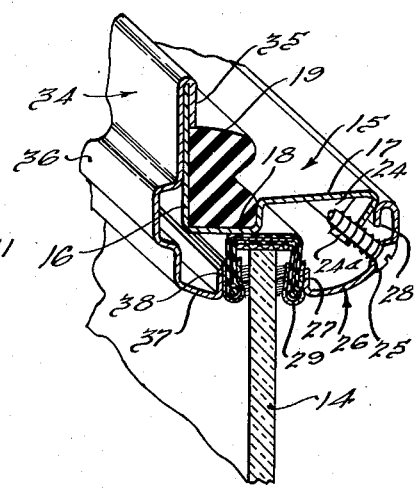
INVENTOR.
Robert Cadwallader
BY
Harness and Harris
ATTORNEYS.

Patented May 31, 1949

2,471,810

UNITED STATES PATENT OFFICE 2,471,810

DOOR CONSTRUCTION RECEIVING SLIDABLE WINDOW

Robert Cadwallader, Detroit, Mich., assignor to Chrysler Corporation, Highland Park, Mich., a corporation of Delaware Application August 2, 1944, Serial No. 547,675

5 Claims. (Cl. 296—44)

This application relates to a door construction. More specifically it relates to a vehicle door construction adapted to carry a slidable window.

It is recognized that for practical purposes the outside width of an automobile may no longer be increased, and thus any increase in the interior width must come through reduction in the thickness of the body walls. This necessarily means a reduction in the thickness of the automobile doors.

I have invented improvements in the portions of automobile doors receiving slidable windows, that make possible the reduction of the width of the door and accomplish certain other advantages.

One consideration influencing the problem of obtaining such constructions is the fact that quite frequently vehicle doors are curved in conformance with the shape of the vehicle body and yet must have straight portions to receive a straight window.

An object of the present invention is to provide improvements in a door construction that make it possible for the door to have a satisfactory minimum thickness. They are most advantageously applied to the door of an automotive vehicle where space requirements dictate that the interior width of the vehicle body be as great as possible, and the exterior width of the vehicle body be as great as possible, and the exterior width have a definite maximum.

A further object is to improve the portion of a door receiving the upper or outer edge of a slidable window. It is customary in automobile doors to provide a slidable window, and thus the door construction must be of a special type enabled to receive the edge of the slidable window.

Another object is to make improvements in a curved door. The modern tendency in automotive design is to make a vehicle door curved in conformance with the vehicle body. Since in general the door window is maintained straight, the curved door tends to be quite thick. Accordingly, an object of this invention is to improve a door of this type in such a way that its thickness is kept to a minimum.

Still another object is to improve the overall strength and general construction of a portion of a vehicle door receiving a window, more specifically, a sliding window.

Other objects will appear from the disclosure.

In the drawings:

Fig. 1 is a side view of a door embodying the novel construction of the present invention;

Fig. 2 is a sectional view taken on the line 2—2 of Fig. 1; and

Figs. 3 and 4 are sectional views similar to that of Fig. 2, but of two modified forms of door construction.

Reference character 10 represents a door that may be used at the forward portion of an automobile body. It includes a body portion 11, a frame 12 at the upper end of the body portion, a pivotal window 13, and a sliding window 14. The windows may be of a suitable substance such as glass. The upper portion of the frame 12 as shown in Fig. 2, has a sheet metal element 15 having an outwardly extending leg 16 and a laterally inwardly extending leg 17 provided with a depression 18 at the juncture of the legs. A sealing strip 19, which may be of a suitable deformable substance such as rubber, rests in the depression 18 and against the outwardly extending leg 16. It may be bonded to the legs 16 and 17 and/or the channel 18 may be relied upon for retaining the sealing strip in position. There is provided a sheet metal element 20 having a bent-back flange 21 at the outer edge thereof embracing the outer edge of the outwardly extending leg 16. The flange 21 by engaging the sealing strip 19 also serves to aid in keeping the sealing strip in position. A rib 22 is formed in the element 20 so as to extend away from the leg 16 of the element 15. The element 20 projects inwardly of the depression 18 formed in the element 15 and is embraced by a U-shaped decorative strip 23 that may be formed of stainless steel. The leg 17 of the element 15 has a flange 24 provided with struck-out portions 24ᵃ to which is attached by means of one or more screws 25, a sheet-metal element 26 having a flange 27 at one side in spaced opposed relation to the portion of the element 20 projecting inwardly of the depression 18 and a flange 28 at the other side in engagement with the flange 24 of element 15 adjacent its juncture with the leg 17 of the element 15. Clamped between the decorative strip 23 and the flange 27 is a channel 29 formed of a metallic core and covered with cloth or fabric. The channel 29 receives the upper edge of the window 14 which slides into and out of the channel as the window is raised to closed position and lowered to open position. The channel is solidly backed against the element 15 at the portion of the leg 17 forming the depression 18. The parts in the dotted lines in Fig. 2 illustrate the manner in which the upper edge of the door 10 cooperates with the body of the car to which the door is attached. A windlace 30 engages the edge of the element 26. A channel 31 is pressed into the upper corner of the seal 19 as shown. A gutter 32 extends out over the outer edges of the elements 15 and 20. Reference character 33 designates a portion of the side of the automobile body that slopes upwardly and inwardly slightly to merge with the top not shown.

It will be understood that the body portion 33 curves as is the custom with automobile bodies. The curve will be slightly to the right as viewed in Fig. 2. This means that the gutter 32 and the channel 31 will also curve slightly to the right, and the seal 19 curves in conformance with the channel 31. Thus the section taken to the rear of that of Fig. 2 would show the seal 19 displaced somewhat to the right of its position of Fig. 2. A depression 18 will also be displaced to the right as well as the outwardly extending leg 16 of the element 15. This means that the very outer portion of the element 20 is somewhat displaced to the right. In contrast with all this the window 14 is not curved but straight and consequently the parts immediately associated with it must also be straight. These parts include the channel 29, the decorative strip 23, and the inner edge of the element 20. Thus the outer edge of the element 20 is displaced somewhat to the right of its position of Fig. 2 at a region to the rear of Fig. 2 whereas the inner edge remains in the same position in both regions. This curving of the outer edge and the holding straight of the inner edge are made possible by the use of the outwardly pressed rib 22. The use of the rib makes it possible during the shaping operation of the element 20 to make the inner edge straight and the outer edge curved. This would also be possible if the outer edge were spaced laterally outwardly, that is, to be left of Fig. 2 as far as the outermost portion of the rib 22. However, such an arrangement would increase the width of the top of the frame 12 and with the outside dimension of the body held constant, would decrease the interior width of the body. This is, of course, to be avoided.

The width of the element 26 is kept constant, and this means that the edge of the leg 17 of the element 15 is held straight. Consequently, the width of the leg 17 will vary.

In the modified construction of Fig. 3 the element 15 is the same as the corresponding element of Fig. 2, that is, it has an outwardly extending leg 16, laterally extending leg 17 having a depressed portion 18, and inwardly extending flange 24 on the edge of the laterally extending leg 17 provided with struck-out portions 24ᵃ. The element 26 in Fig. 3 is the same as that of Fig. 2 in that it has flanges 27 and 28 and is secured to the flange 24 by one or more screws 25 that engage the struck-out portions 24ᵃ. The sealing strip 19 is the same as that shown in Fig. 2 and is merely held in the depression 18 in the leg 17 of the element 15 and engaged with the leg 16. However, the element 20 of Fig. 2 is replaced by a sheet-metal element 34. A bent-back flange 35 on the element 34 clamps the outer edge thereof to the outer edge of the element 15. The sealing strip 19 is bonded to the element 15 and/or is retained in position by the depression 18 and by the flange 35. The element 34 is provided with a rib 36, which is fairly wide and is pressed away from the leg 16 of the element 15 adjacent the juncture of the legs 16 and 17. The inner part of the element 34 has a laterally inwardly extending portion 37 and terminates in an outwardly extending flange 38 in opposed spaced relation to the flange 27 on the element 26. A metal-and-fabric channel 29 receives the window 14 and is clamped between the flanges 27 and 38 with solid backing against the depression 18 in the leg 17 of the element 15. As compared to element 29 of Fig. 2, element 29 of Fig. 3 is somewhat laterally inwardly displaced and projects somewhat beyond portion 18. There is provided no separate decorative strip for the inner edge of the element 34. Instead the lateral portion 37 and the outwardly directed flange 38 are substituted for the decorative strip. The rib 36 pressed in the element 34 so as to extend away from the leg 16 of the element 15 serves the same purpose as the corresponding rib in the construction of Fig. 2. The rib 36 permits the outer part of the element 34 to be curved in conformance with the curvature of the automobile body and the sealing strip 19 while the portion 37 and the flange 38 are held straight so as to aid in clamping the straight channel 29 receiving the straight window 14. The element 26 is of uniform width and straight, and the edge of the leg 17 of the element 15 is also straight. Thus the curving of the seal 19 in the depression 18 receiving the seal requires a variation in the width of the portion of the leg 17 between the depression 18 and the edge thereof. These things are, of course, also true in the construction of Fig. 2. As in the case of Fig. 2, the provision of the rib 36 rather than the placing of the outer portion of the element 34 laterally outwardly as far as the rib 36 brings about a reduction in the width of the upper portion of the frame 12.

A second alternative form is shown in Fig. 4. Here an element 39 has an outwardly extending leg 40 and a laterally extending leg 41 having a depression 42 receiving the seal 19, a portion 42' extending laterally and somewhat outwardly, and an inwardly extending flange 43 at the edge of the portion 42'. An element 44 is provided having at an outer edge an inwardly directed flange 45 clamping the outer edge of leg 40 of the element 39. The sealing strip 19 may be bonded in the depression 42 and against the leg 40, and/or the depression 42 with the aid of the flange 45 may be relied on to hold the seal in place. The element 44 has a fairly wide rib 46 pressed away from the leg 40 adjacent the juncture of leg 40 with the leg 41. The inner part of the element 44 has a laterally directed portion 47, an outwardly extending portion 48 and a laterally directed portion 49 extending in contact with the depression 42 of the leg 41 of the element 39 and laterally inwardly beyond the depression. The portion 49 may, if desired, be bonded to the depression 42 to provide a reinforced construction. An element 50 is provided having a body portion extending inwardly from the lateral leg 41 of the element 39 and reverse flanges 51 and 52. The element 50 is secured to the flange 43 of the element 39 by means of one or more screws 53 that pass through the body portion of the element 50 and have threaded engagement with the flanges 43 and 51. The flange 52 is in spaced opposed relation to the portion 48 of the element 44 and the channel 29 receiving the upper edge of the window 14 is clamped between the portion 48 and the flange 52. The channel 29 is backed against the portion 49 of the element 44, and since the portion 49 engages the depression 42 on the element 39 the channel is in effect backed against the depression 42. The rib 46 serves the same purpose as the corresponding ribs in Figs. 2 and 3; that is, it permits the portion 47, 48, and 49 to be straight and the outer part of the element 44 to be curved in conformance with the curvature of the automobile body.

Various elements throughout the specification have been described as being of sheet metal, but it is to be understood that this is merely illustrative for they may be formed of other suitable materials if desired.

I claim:

1. In a door construction having a window slidable toward and away from an end of the door, a deformable sealing strip positioned at the said end of the door, a first sheet metal element having an outwardly extending leg and a laterally extending leg formed of a first portion immediately adjacent the outwardly extending leg, a second portion extending laterally from the first portion in outwardly displaced relation, and an outwardly extending portion joining the first and second portions, the sealing strip being received between and held by the outwardly extending leg and the first portion and the outwardly extending portion of the laterally extending leg, a second sheet metal element having an outer portion clamping the outer edge of the outwardly extending leg of the first element and extending inwardly along the outwardly extending leg to a region inward of the first portion of the laterally extending leg and including a rib formation extending away from the first element, a third sheet-metal element having an outer portion detachably secured to the second portion of the laterally extending leg of the first element and an inner portion positioned inward of the laterally extending leg of the first element in opposed relation to an inner portion of the second element, and a channel positioned inward of the laterally extending leg of the first element and having a base solidly backed by the first portion of the laterally extending leg of the first element and sides held between the opposed inner portions of the second and third elements, the channel slidably receiving the outer edge of the slidable window, the rib permitting the inner portion of the second element and the channel to remain straight for receiving a straight window and the outer portion of the second element and the outwardly extending leg of the first element to be curved in conformance with the external contour of the vehicle with which the door construction is associated.

2. In a door construction having a window slidable toward and away from an end of the door, a deformable sealing strip positioned at the said end of the door, a first element having an outwardly extending leg and a laterally extending leg formed of a first portion immediately adjacent the outwardly extending leg, a second portion extending laterally from the first portion in outwardly displaced relation, and an outwardly extending portion joining the first and second portions, the sealing strip being received between and held by the outwardly extending leg and the first portion and the outwardly extending portion of the laterally extending leg, a second element having an outer portion clamping the outer edge of the outwardly extending leg of the first element and extending inwardly along the outwardly extending leg to a region inward of the first portion of the laterally extending leg and then laterally in the direction of the laterally extending leg of the first element and terminating in an inner edge extending outwardly toward the first portion of the laterally extending leg, the second element having adjacent the outwardly extending leg of the first element a rib pressed in the second element away from the first element, a third element having an outer portion element detachably secured to the second portion of the laterally extending leg of the first element and extending inwardly and laterally toward the second element and terminating in an inner edge extending toward the laterally extending leg of the first element in opposed relation to the inner edge of the second element, and a channel having a base resting solidly against the first portion of the laterally extending leg of the first element and sides clamped between the inner edges of the first and second elements, the channel slidably receiving the outer edge of the slidable window, the rib permitting the inner portion of the second element and the channel to remain straight for receiving a straight window and the outer portion of the second element and the outwardly extending leg of the first element to be curved in conformance with the external contour of the vehicle with which the door construction is associated.

3. In a door construction having a window slidable toward and away from an end of the door, a sealing strip for the said end of the door, a first sheet-metal element having an outwardly extending leg and a laterally extending leg provided with an inwardly depending flange, the first element receiving the sealing strip at the juncture of the legs, a second sheet-metal element connected to the outwardly extending leg of the first element and extending inwardly of the laterally extending leg, the second element having a rib pressed therein extending away from the first element, a third sheet-metal element extending from adjacent the end of the laterally extending leg of the first element, inwardly from the laterally extending leg, screws engaging the depending flange on the laterally extending leg and the third element for fastening the third element to the laterally extending leg, and a channel having a base solidly backed against the laterally extending leg of the first element at a portion thereof engaged by the sealing strip and sides engaged by the second and third elements, the channel slidably receiving the outer edge of the slidable window, the rib permitting the inner portion of the second element and the channel to remain straight for receiving a straight window and the outer portion of the second element and the outwardly extending leg of the first element to be curved in conformance with the external contour of the vehicle with which the door construction is associated.

4. In a door construction having a window slidable toward and away from one end of the door, a sealing strip extending along the said end, a first element having an outwardly extending leg and a laterally extending leg, the sealing strip being connected to the first element at the juncture of the legs, a second element attached to the outwardly extending leg and extending along the said leg inwardly of the laterally extending leg and having a rib pressed therein away from the first element, a third element attached to the laterally extending leg and extending inwardly thereof, and a channel held between the second and third elements for slidably receiving the outer edge of the slidable window, the rib permitting the inner portion of the second element and the channel to remain straight for receiving a straight window and the outer portion of the second element and the outwardly extending leg of the first element to be curved in conformance with the external contour of the vehicle with which the door construction is associated.

5. In a door construction having a window slidable to and from one end of the door, a sealing strip extending along the said one end of the door, a first element having an outwardly extending leg and a laterally extending leg and receiving the strip at the juncture of the legs, a second element attached to the outwardly extending leg and extending inwardly of the laterally extending leg, the second element having a rib pressed therein away from the first element, a third element attached to the laterally extending leg and extending inwardly thereof free of connection with the second element, and a channel held between the second and third elements for slidably receiving the outer edge of the slidable window, the rib permitting the inner portion of the second element and the channel to remain straight for receiving a straight window and the outer portion of the second element and the outwardly extending leg of the first element to be curved in conformance with the external contour of the vehicle with which the door construction is associated.

ROBERT CADWALLADER.

REFERENCES CITED

The following references are of record in the file of this patent:

UNITED STATES PATENTS

| Number | Name | Date |
|---|---|---|
| 1,670,466 | Marshall | May 22, 1928 |
| 1,720,913 | McDowell | July 16, 1929 |
| 1,965,014 | Trautvetter | July 3, 1934 |
| 2,050,070 | Smith | Aug. 4, 1936 |
| 2,127,499 | Widman et al. | Aug. 23, 1938 |
| 2,127,971 | Graebner | Aug. 23, 1938 |
| 2,140,844 | Mirus-Leuschner | Dec. 20, 1938 |
| 2,176,964 | Harrah | Oct. 24, 1939 |
| 2,350,297 | Vesta | May 30, 1944 |
| 2,356,976 | Conlon | Aug. 29, 1944 |